US00RE36565E

United States Patent [19]

Burgoon et al.

[11] E Patent Number: Re. 36,565

[45] Reissued Date of Patent: Feb. 15, 2000

[54] MOBILE SURFACE SCRUBBER SOLUTION RECOVERY SYSTEM

[75] Inventors: Jack L. Burgoon, Toledo; Donald E. Line, Arlington, both of Ohio

[73] Assignee: Alto U. S. Inc., Chesterfield, Mo.

[21] Appl. No.: 09/084,700

[22] Filed: May 26, 1998

Related U.S. Patent Documents

Reissue of:

[64] Patent No.: 5,623,743
Issued: Apr. 29, 1997
Appl. No.: 08/659,019
Filed: Jun. 4, 1996

[51] Int. Cl.[7] ..... A47L 11/30

[52] U.S. Cl. ..... 15/320; 15/50.1; 15/98; 15/401

[58] Field of Search ..... 15/50.1, 50.2, 15/50.3, 98, 245, 320, 401

[56] References Cited

U.S. PATENT DOCUMENTS

| | | | |
|---|---|---|---|
| 2,829,391 | 4/1958 | Swanson et al. . | |
| 3,206,787 | 9/1965 | Daniels et al. . | |
| 3,277,511 | 10/1966 | Little et al. | 15/320 |
| 3,702,488 | 11/1972 | Kasper . | |
| 3,837,029 | 9/1974 | Kasper | 15/50.3 |
| 3,939,518 | 2/1976 | Whitney et al. . | |
| 3,942,218 | 3/1976 | Krier et al. | 15/50.1 X |
| 4,006,506 | 2/1977 | Burgoon | 15/50.1 X |
| 4,037,289 | 7/1977 | Dojan | 15/50.1 X |
| 4,158,901 | 6/1979 | Wulff et al. | 15/50.1 X |
| 4,173,056 | 11/1979 | Geyer | 15/50.1 X |
| 4,317,252 | 3/1982 | Knowlton | 15/50.1 X |
| 4,363,152 | 12/1982 | Karpanty | 15/50.1 X |
| 4,619,010 | 10/1986 | Burgoon | 15/50.1 X |
| 4,805,256 | 2/1989 | Mason et al. | 15/50.1 X |
| 5,239,720 | 8/1993 | Wood et al. | 15/50.1 X |
| 5,265,300 | 11/1993 | O'Hara et al. | 15/320 X |
| 5,377,376 | 1/1995 | Wood et al. . | |
| 5,455,985 | 10/1995 | Hamline et al. . | |
| 5,524,320 | 6/1996 | Zachhuber | 15/50.1 X |

OTHER PUBLICATIONS

Brochure by Clarke American–Lincoln entitled American–Lincoln 7700 Sweeper Scrubber; dated May 1988; 4 pages.

*Primary Examiner*—Chris K. Moore
*Attorney, Agent, or Firm*—Senninger, Powers, Leavitt & Roedel

[57] ABSTRACT

A mobile surface scrubber for scrubbing a surface wetted with cleaning solution. The scrubber comprises a frame, a plurality of wheels rotatably mounted on the frame, scrub brush means attached to the frame and positioned to scrub the wetted surface as the scrubber is transported over the surface, and a recovery system for recovering cleaning solution from the surface. The recovery system includes a return tank for retaining recovered cleaning solution, a rear squeegee pivotally connected to the frame, and left and right side squeegees mounted on the frame. The rear squeegee is positionable to contact the surface behind the scrub brush means when the scrubber is transported in the forward direction. The side squeegees are unvaryingly oriented with respect to the frame and positionable to contact the surface on opposite sides of the scrub brush means. The rear squeegee is so constructed and operable that when the scrubber is transported in a right turning direction, the rear squeegee pivots relative to the frame to a position in which the right end of the rear squeegee overlaps the rearward end of the right side squeegee, and when the scrubber is transported in a left turning direction, the rear squeegee pivots relative to the frame to a position in which the left end of the rear squeegee overlaps the rearward end of the left side squeegee.

22 Claims, 7 Drawing Sheets

MOBILE SURFACE SCRUBBER SOLUTION RECOVERY SYSTEM

Matter enclosed in heavy brackets [ ] appears in the original patent but forms no part of this reissue specification; matter printed in italics indicates the additions made by reissue.

BACKGROUND OF THE INVENTION

This invention relates generally to a mobile surface scrubber for scrubbing a surface wetted with cleaning solution, and more particularly the invention relates to a solution recovery system for recovering cleaning solution from the wetted surface.

Mobile surface scrubbers typically include a cleaning solution dispensing system, scrub brushes for scrubbing the wetted surface and one or more squeegees for removing used cleaning solution from the surface. The squeegees are frequently connected to a vacuum to improve the removal of the cleaning solution. In addition, scrubbers frequently include sweeper brushes to sweep debris from the surfaces, either concurrently with or independently from the surface scrubbing operation. The sweeper brushes are usually adapted to sweep the debris into a recovery bin. A vacuum is also frequently used to draw debris into the recovery bin.

The scrubbers may be driven over a surface such as the floor of a factory or warehouse so that the sweeper brushes sweep debris into the bin and the scrubber brushes scrub the wetted floor. Although machines of this type work well when traveling forward in a straight line, cleaning solution may bypass the squeegees, leaving a trail of solution behind the machine, when the machine turns left or right.

Several developments have been made to improve the performance of the squeegees during turns so that less cleaning solution bypasses the squeegees. For instance, the rear squeegee blade has been formed in an arc or chevron so that the cleaning solution is directed away from the ends of the blade and toward its center where a vacuum is located. Further, some machines have been equipped with rear swing squeegees which pivot about a vertical axis during turns to project a longer effective blade length as compared to rigidly mounted squeegees. Longer effective blade lengths permit the blade to pass over more wetted surface, thereby retaining and recovering more of the cleaning solution. However, these rear squeegee designs have not entirely overcome the problems associated with recovering cleaning solution during turns, because conventional rear squeegees do not pass over the entire wetted surface, even when they are arcuate and pivot.

Some prior scrubbers have rigidly mounted side squeegees which extend parallel with the sides of the scrubber frame and retain most of the cleaning solution beneath the machine during turns. However, because the motion of the machine during turns is not exactly perpendicular to the side squeegees, some of the cleaning solution flows parallel to the side squeegees and eventually flows past the ends of the squeegees so that streaks of cleaning solution trail behind the machines. The cleaning solution usually flows past the front end of the inside side squeegee during turns due to the angle and location of the inside side squeegee relative to the center of turning.

In order to prevent the cleaning solution from flowing parallel to the side squeegees and past their forward ends, some scrubbers have been manufactured so that the side squeegees pivot during turns to an orientation where the fluid is directed rearward toward the rear squeegee. The pivoting side squeegees are connected to the rear squeegees by linkages which drive the side squeegees between a straight-traveling position in which they are generally parallel with the side of the scrubber, and the turning positions in which the inside squeegee angles forward and inward, and the outside squeegee angles forward and outward. However, these linkages increase the complexity of the solution recovery system thereby increasing the cost and risk of failure.

SUMMARY OF THE INVENTION

Among the several objects and features of the present invention may be noted the provision of a scrubber having squeegees which retain substantially all cleaning solution and prevent a trail of cleaning solution when the scrubber turns; and the provision of a mobile surface scrubber having side squeegees which are unvaryingly oriented with respect to the scrubber frame to reduce manufacturing expense and risk maintenance.

Briefly, apparatus of this invention is a mobile surface scrubber for scrubbing a surface wetted with cleaning solution. The scrubber comprises a frame, a plurality of wheels rotatably mounted on the frame, scrub brush means attached to the frame and positioned to scrub the wetted surface as the scrubber is transported over the surface, and a recovery system for recovering cleaning solution from the surface. The recovery system includes a return tank for retaining recovered cleaning solution, a rear squeegee pivotally connected to the frame, and left and right side squeegees mounted on the frame. The rear squeegee is positionable to contact the surface behind the scrub brush means when the scrubber is transported in the forward direction. The side squeegees are unvaryingly oriented with respect to the frame and positionable to contact the surface on opposite sides of the scrub brush means. The rear squeegee is so constructed and operable that when the scrubber is transported in a right turning direction, the rear squeegee pivots relative to the frame to a position in which the right end of the rear squeegee overlaps the rearward end of the right side squeegee, and when the scrubber is transported in a left turning direction, the rear squeegee pivots relative to the frame to a position in which the left end of the rear squeegee overlaps the rearward end of the left side squeegee.

In another aspect of the invention, the surface scrubber comprises a frame, a plurality of wheels rotatably mounted on the frame, scrub brush means attached to the frame and positioned to scrub the wetted surface, and left and right side squeegees mounted on the frame. The squeegees are unvaryingly oriented with respect to said frame and have rearward portions outboard of the scrub brush means and forward portions extending laterally inwardly and forwardly to positions in front of the scrub brush means.

In still another aspect of the invention, when the surface scrubber is transported in a right turning direction, the rear squeegee pivots relative to the frame to a position in which the rear and right side squeegees form an uninterrupted continuous barrier extending from the left end of the rear squeegee to the forward end of the right side squeegee for collecting cleaning solution. Similarly, when the scrubber is transported in a left turning direction, the rear squeegee pivots to a position in which the rear and left side squeegees form an uninterrupted continuous barrier extending from the right end of the rear squeegee to the forward end of the left side squeegee.

Other objects and features of the invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
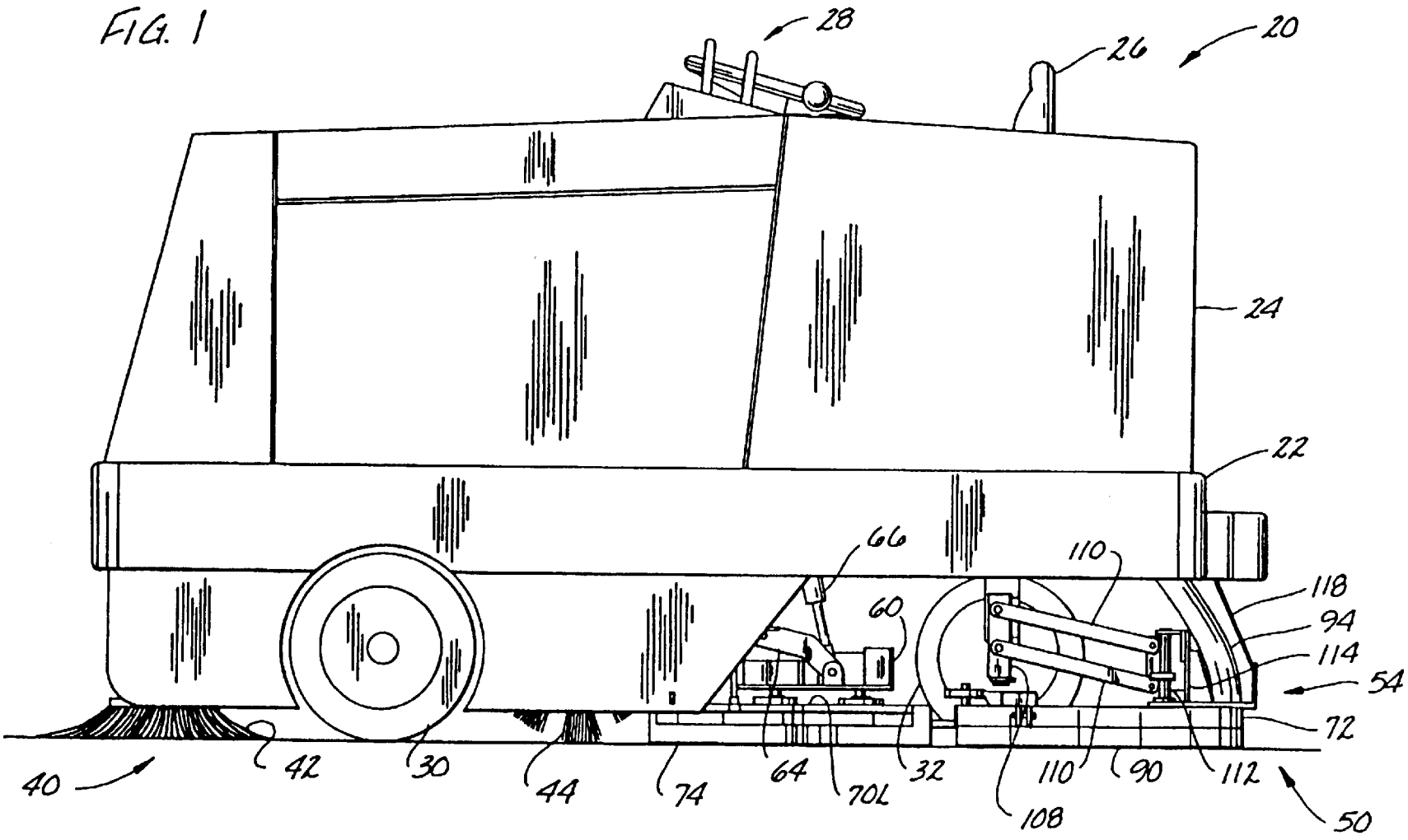
FIG. 1 is a side elevation of a mobile surface scrubber and solution recovery system of the present invention.

Referring now to the drawings and in particular to FIG. 1, a mobile surface scrubber indicated generally at 20 is of the type used to sweep and scrub a surface such as a warehouse or factory floor or a parking lot. The surface scrubber 20 has a frame 22 supporting a body 24 which houses the various sweeper and scrubber components. A seat 26 mounted on the body 24 permits an operator to ride on the scrubber 20. Hand operated controls, generally designated as 28, are positioned in front of the seat 24 so that the operator may access them when seated to control the scrubber 20 operation. Foot operated controls (not shown) are positioned on the floor in front of the seat 24. Two front wheels 30 and one rear wheel 32 are mounted on the frame 22. The rear wheel 32 is driven by an engine (not shown) such as a 2 liter, 45 hp. 4 cycle. Toyota gasoline powered engine, a 63 hp, gasoline or LP powered Ford engine, or a 46 hp, 4 cycle, Perkins diesel powered engine to propel the scrubber over the surface. The rear wheel 32 is also pivotable about a vertical axis so that the scrubber 20 may be turned to travel to the left or right.

Figure 2:
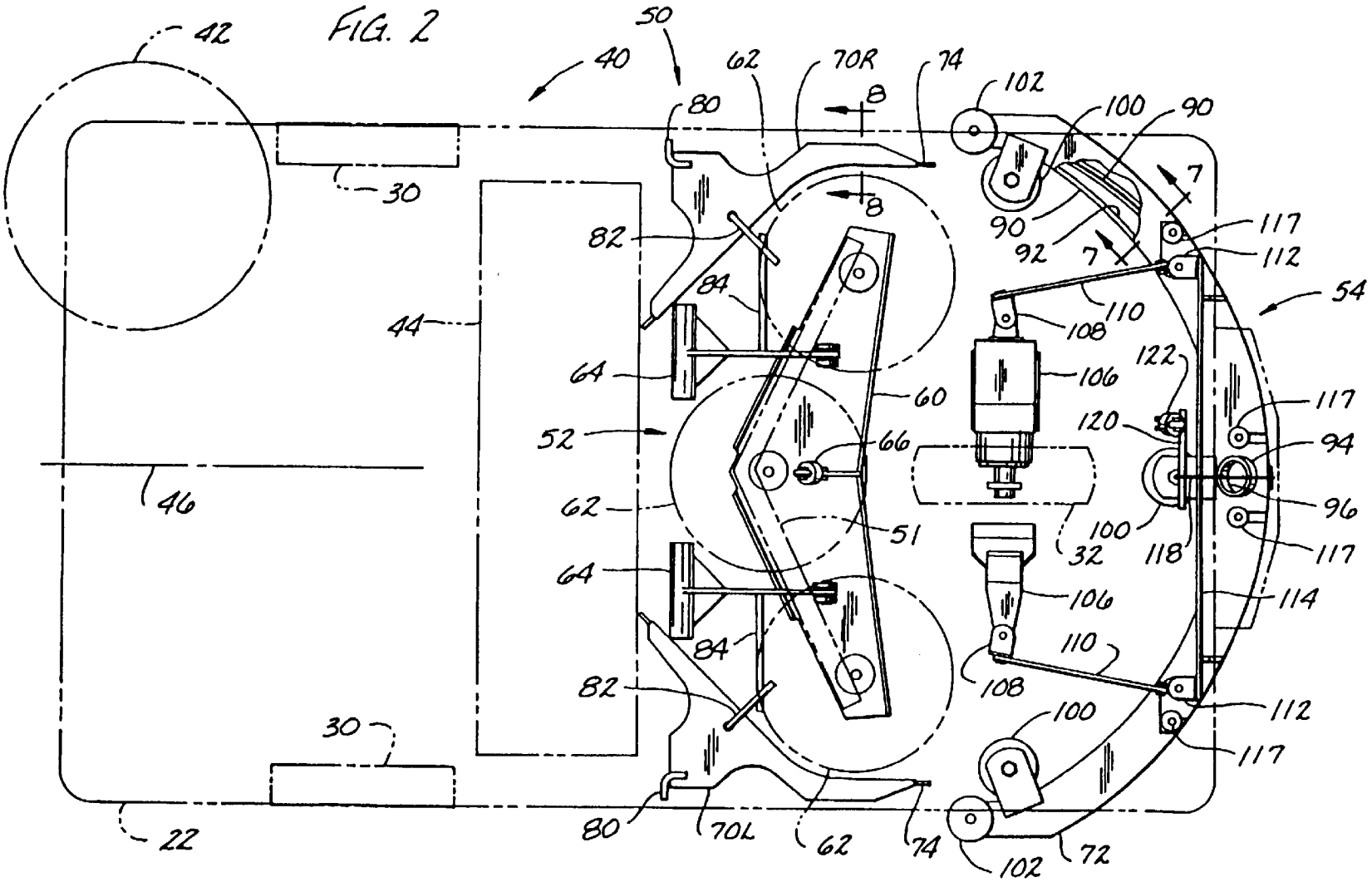
FIG. 2 is a top plan of the solution recovery system.

The scrubber 20 is equipped with a sweeper system, generally indicated at 40 in FIG. 2, which includes sweeper brushes or brooms 42, 44 and a vacuum (not shown) for removing loose debris. Broom 42 is a rotary disc curb broom which is rotatably mounted on the frame 22 at its front right corner. The curb broom 42 rotates counterclockwise (as viewed from the top) about a vertical axis to sweep debris toward the central longitudinal axis or centerline 46 (FIG. 2) of the scrubber 20. As its name implies, the curb broom 42 is particularly useful in sweeping debris away from curbs, walls and other fixed obstructions. Broom 44 is a rotary cylindrical, main broom positioned behind the front wheels 30. The broom 44 rotates clockwise (as viewed in FIG. 1) about an horizontal axis to sweep debris forward and upward into a collection bin (not shown) mounted on the frame 22 above and forward of the front wheels 30. A vacuum filtration system (not shown) retains the debris in the bin and prevents dust from escaping into the surrounding environment. In the preferred embodiment, the curb broom 42 is 24 inches in diameter, and the main broom 44 is fifty inches long; however, because the curb broom only partially overlaps the main broom, the area swept by the scrubber 20 is approximately sixty inches wide. The previously described general surface scrubber 20 configuration and the sweeper system 40 configuration are conventional and will not be described in further detail.

Figure 3:
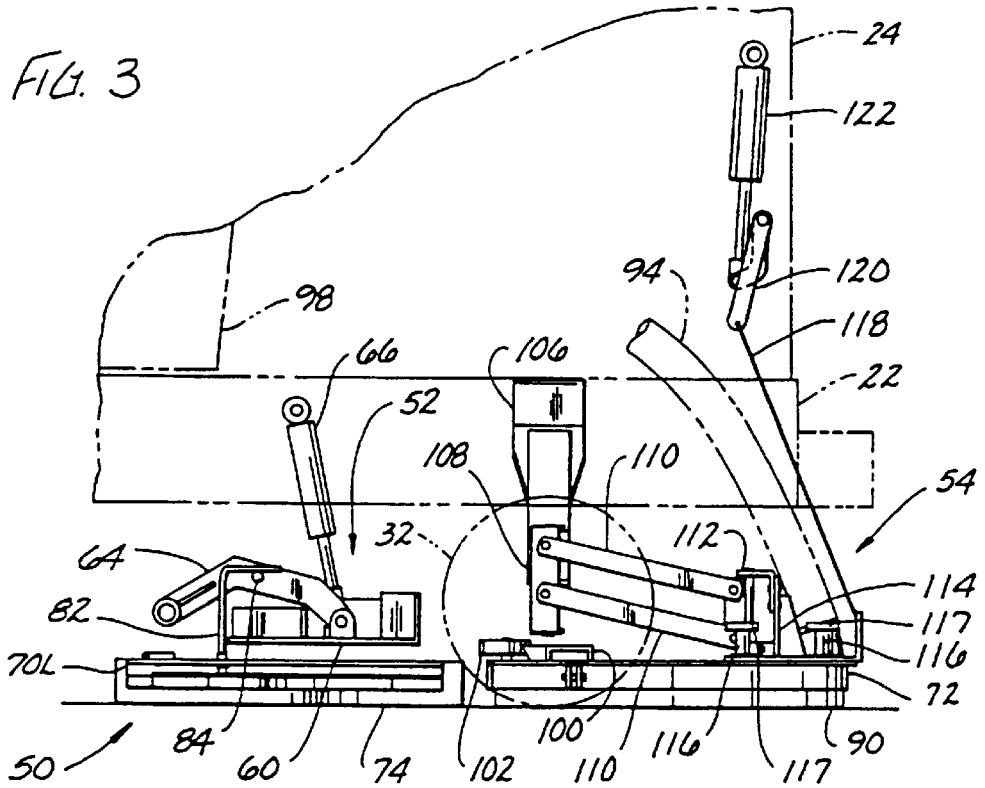
FIG. 3 is a side elevation of the solution recovery system.
Figure 4:
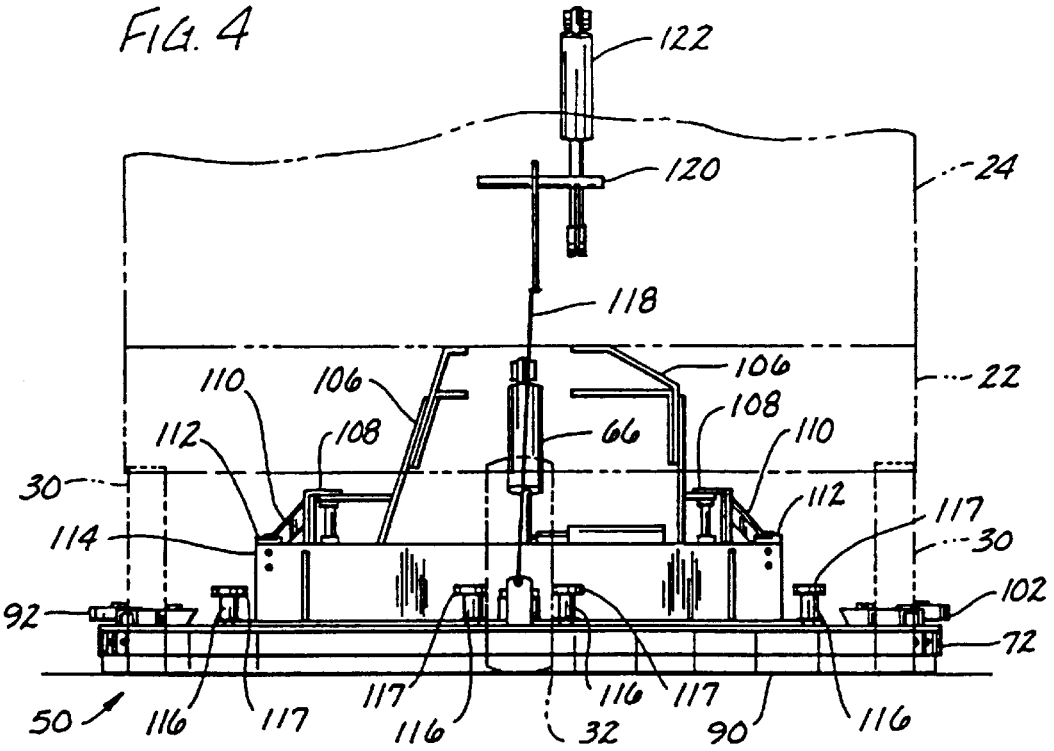
FIG. 4 is a rear elevation of the system.

As illustrated in FIGS. 2 through 4, the scrubber system, indicated generally at 50, comprises a cleaning solution dispensing system 51 (FIG. 2). scrub brush means (generally designated 52), and a solution recovery system (generally designated 54). As is conventional in the art, the solution dispensing system 51 includes a solution storage tank (not shown) and nozzles (not shown) which are connected to the tank for dispensing cleaning fluid from the tank to the surface in the vicinity of the scrub brush means 52.

The scrub brush means 52 includes a chevron-shaped plate 60 secured to the frame 22, and three rotary disk scrub brushes 62 rotatably mounted on the plate. Each of the brushes 62 bears down on the surface and is powered to rotate about a vertical axis to scrub the surface. Although each of the brushes 62 is approximately seventeen inches in diameter, the central brush is positioned somewhat forward of the left and right brushes so they are laterally overlapped and the area scrubbed during each pass is fifty inches wide in the preferred embodiment. The plate 60 is connected to the frame 22 by two links 64 which are pivotally connected to both the frame and the plate. An hydraulic actuator 66 connected between the frame 22 and plate 60 permits the plate to be raised (FIG. 6) and lowered (FIG. 3). Although the scrub brush means 52 of the preferred embodiment includes a plate and three rotary disk scrub brushes, it should be understood that the term is used herein to mean any scrubbing apparatus known in the art, including any number of brushes or the like, and other similar apparatus.

Figure 6:
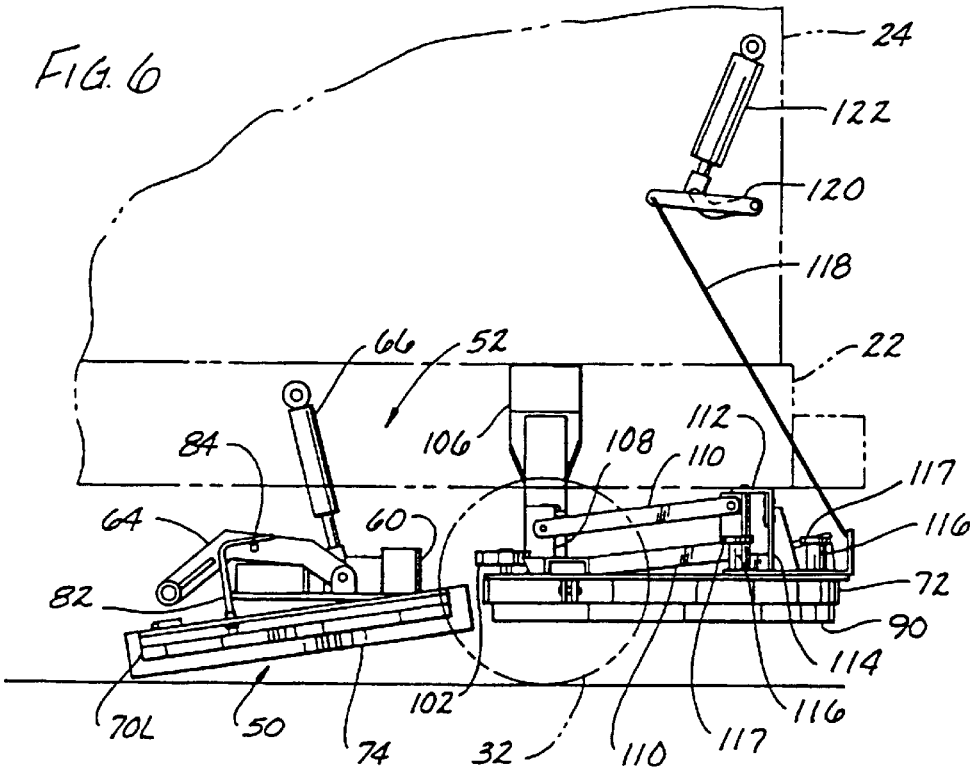
FIG. 6 is a side elevation of the system with the squeegees raised.
Figure 8:
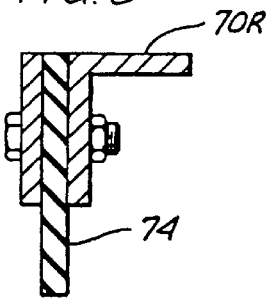
FIG. 8 is a vertical cross section of the right side squeegee taken in the plane of line 8—8 of FIG. 2.

The solution recovery system 54 includes right and left side squeegees 70R, 70L, respectively, and a pivotally-mounted, arcuate, rear squeegee 72. The side squeegees 70R, 70L are mounted outboard from the scrub brush means 52. As shown in FIG. 8, each of the side squeegees 70R, 70L includes a blade 74 which wipes the surface ideally to retain the dispensed cleaning solution inboard from the side squeegee. The blades 74 have rearward portions which extend parallel to the longitudinal centerline 46 of the scrubber 20 and forward portions which extend inwardly and forwardly from the respective rearward portions to forward ends positioned in front of the left and right scrub brushes 62 of the scrub brush means 52. The forward ends of the side squeegee blades 74 are spaced from one another on opposite sides of the centerline 46 by a distance which is greater than the diameter of the central scrub brush 62. The rearward portions of the side squeegee blades 74 extend to rearward ends which are positioned behind the rotational axes of the left and right scrub brushes 62. The side squeegees 70R, 70L are mounted on the frame 22 so that they do not pivot substantially as the scrubber 20 turns left or right. In other words, the side squeegees 70R, 70L are unvaryingly oriented relative to the frame 22. However, each of the side squeegees 70R, 70L includes an horizontal axle 80 connected to the frame 22 so that the squeegee can pivot upward away from the surface to ride over obstacles and follow the contour of the surface being scrubbed. Each side squeegee 70R, 70L also includes an arm 82 (FIG. 2) which engages a bar 84 extending from the corresponding link 64 supporting the scrub brush means 52 so that the squeegees are raised when the scrub brush means is raised by the hydraulic cylinder 66, as shown in FIG. 6.

Figure 7:
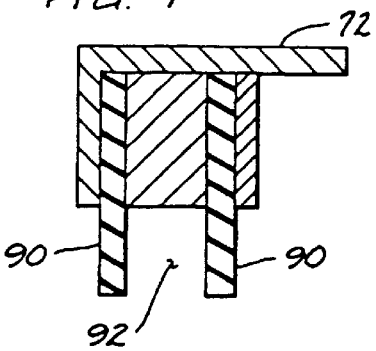
FIG. 7 is a vertical cross section of the rear squeegee taken in the plane of line 7—7 of FIG. 2.

Referring to FIGS. 2, 3 and 7, the rear squeegee 72 includes two blades 90 which define a channel 92. A vacuum hose 94 is connected to an orifice 96 midway along the rear squeegee 72 so that solution trapped within the channel 92 is sucked into a recovery tank 98 (FIG. 3) to leave the surface virtually dry behind the rear squeegee 72. Three casters 100 mounted on the rear squeegee 72 support the squeegee so that the blades wipe against the surface being cleaned. A wheel 102 is mounted on each end of the rearward squeegee 72 so that the wheel rotates about a vertical axis for fending the squeegee off walls and other obstructions to prevent damage to the squeegee and the obstructions.

Brackets 106 extend down from the frame 22, and compound hinge assemblies 108 pivotally connect two pairs of parallel links 110 to the brackets so that the links are pivotable about vertical and horizontal axes with respect to the brackets. The links 110 extend from the brackets 106 to a connector plate 114 which extends upward from the rear squeegee 72. Compound hinge assemblies 112 connect the links 110 to the connector plate 114 so that the links are pivotable about vertical and horizontal axes with respect to the plate. The link 110 and compound hinge assemblies 108. 112 form parallelogram linkages (as viewed from the side). which allow the rear squeegee 72 to rise and fall to ride over obstructions, but which keep the rear squeegee generally parallel with the frame 22 as it rises and falls so that the squeegee blades 90 ideally contact the surface over their entire lengths. Limited play in the compound hinge assemblies 108. 112 prevents the squeegee 72 from rotating significantly about the longitudinal centerline 46 of the scrubber 20. However, a small amount of play in the hinge assemblies 108. 112 permits the rear squeegee 72 to rotate slightly about the lateral and longitudinal axes of the scrubber 20 to follow minor discontinuities in the surface being scrubbed. Further, the links 110 and compound hinges 108. 112 form a four-bar linkage (as viewed from the top) which permits the rear squeegee 72 to move from side to side with respect to the frame 22. However, because the rearward compound hinges 112 are more closely spaced than the forward hinges 108, the linkage forces the rear squeegee 72 to turn as it moves from side to side so the concave side of the squeegee is always directed toward the scrub brush means 52.

Large nuts 116 (FIG. 3) fasten the connector plate 114 to the rear squeegee 72. The nuts 116 have heads 117 which may be manually gripped and turned to loosen the nuts so that the squeegee 72 may be removed and replaced without tools when the blades 90 are worn or the squeegee needs other maintenance. A cable 118 connects the rear squeegee 72 to a pivotable lever 120 mounted on the frame 22. An actuator 122 (FIG. 3) is mounted on the frame 22 for pivoting the lever 120 to raise and lower the rear squeegee 72 as needed. The flexibility of the cable 118 also permits the rear squeegee 72 to rise and fall to pass over obstructions and to swing from side to side during turns.

The overall operation of the surface scrubber 20 is conventional. An operator operates the scrubber 20 by sitting in the seat 24 and operating the controls 28. The operator may engage the sweeper system 40 or the scrubber system 50 or both to sweep and/or scrub a surface as he or she drives over it in the scrubber 20. During a sweeper pass, the curb broom 42 rotates to sweep debris toward the longitudinal centerline 46. As the machine progresses in a forward direction, the main broom 44 sweeps the debris forward into the collection bin where it is held until the machine is emptied. The single, steered rear wheel 32 enables a tight minimum turning radius so that the machine may be turned at the end of each pass and directed along an adjacent return path. During a scrubber pass, the solution dispensing system 51 dispenses cleaning solution onto the surface either in front of or through the scrub brushes 62. The scrub brushes 62 bear down on the surface and rotate to scrub the surface thereby cleaning it. The side and rear squeegees 70L, 70R, 72 funnel the used solution toward the center of the arcuate rear squeegee where the vacuum sucks the solution through the hose 94 into the recovery tank 98. The recovery tank 98 may be emptied when it becomes full of dirty cleaning solution. In other preferred embodiments, the recovery tank 98 may be outfitted with separators and extra filtration systems so that the filtered cleaning solution may be re-dispensed to extend the time and distance between recovery tank emptying and solution dispensing system replenishment.

Figure 10:
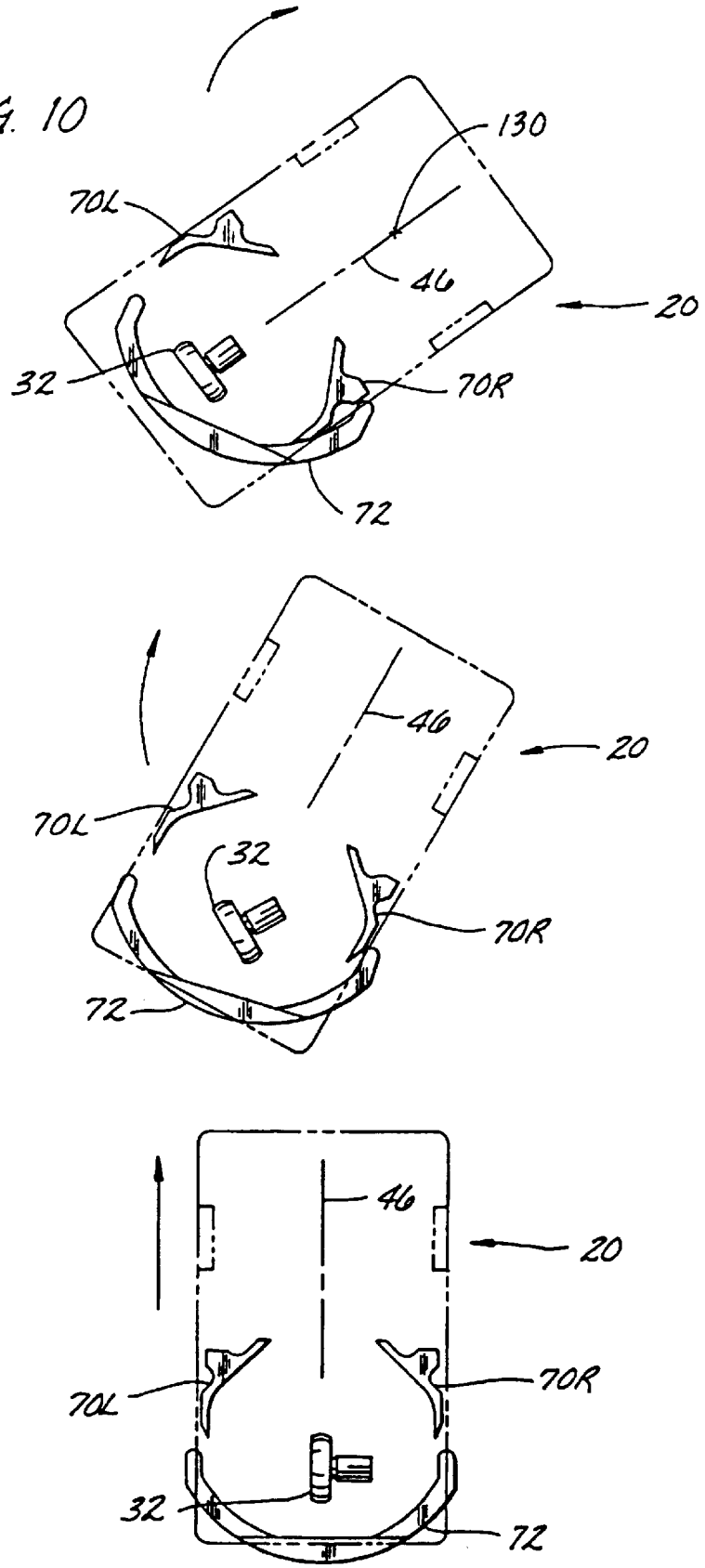
FIG. 10 is a schematic showing the scrubber wheel and squeegee orientations during a typical right-hand turn.

Because the scrubber 20 has rear wheel steering, the scrubber turns right when the rear wheel 32 is turned left, and vice versa, as shown in FIG. 10. Further, due to the rear wheel steering, the rearward portion of the scrubber 20 always moves away from the direction of the turn. For example, in the lowermost view of FIG. 10, the rear wheel 32 is aligned with the longitudinal centerline 46 and the scrubber 20 is travelling in a straight line (toward the top of the view). When the rear wheel 32 is turned to the left as shown in the middle view of FIG. 10, the rearward portion of the scrubber 20 moves to the left which directs the scrubber forward and to the right. If the rear wheel 32 is turned perpendicular to the scrubber 20 centerline 46 as shown in the uppermost view of FIG. 10, the rearward portion also moves to the left and the scrubber is directed to the right: however, because there is no forward motion, the scrubber 20 will spin about a center of turning 130 positioned midway between the front wheels 30. The uppermost view of FIG. 10 shows a minimum radius turn.

When the scrubber 20 is in a right-hand turn, the friction between the rear squeegee blades 90 and the surface causes the rear squeegee 72 to move to the right of the scrubber centerline 46. The tighter the turn, the farther the rear squeegee 72 moves to the right of the longitudinal centerline 46, as shown by a comparison of the middle and uppermost views of FIG. 10.

Figure 5:
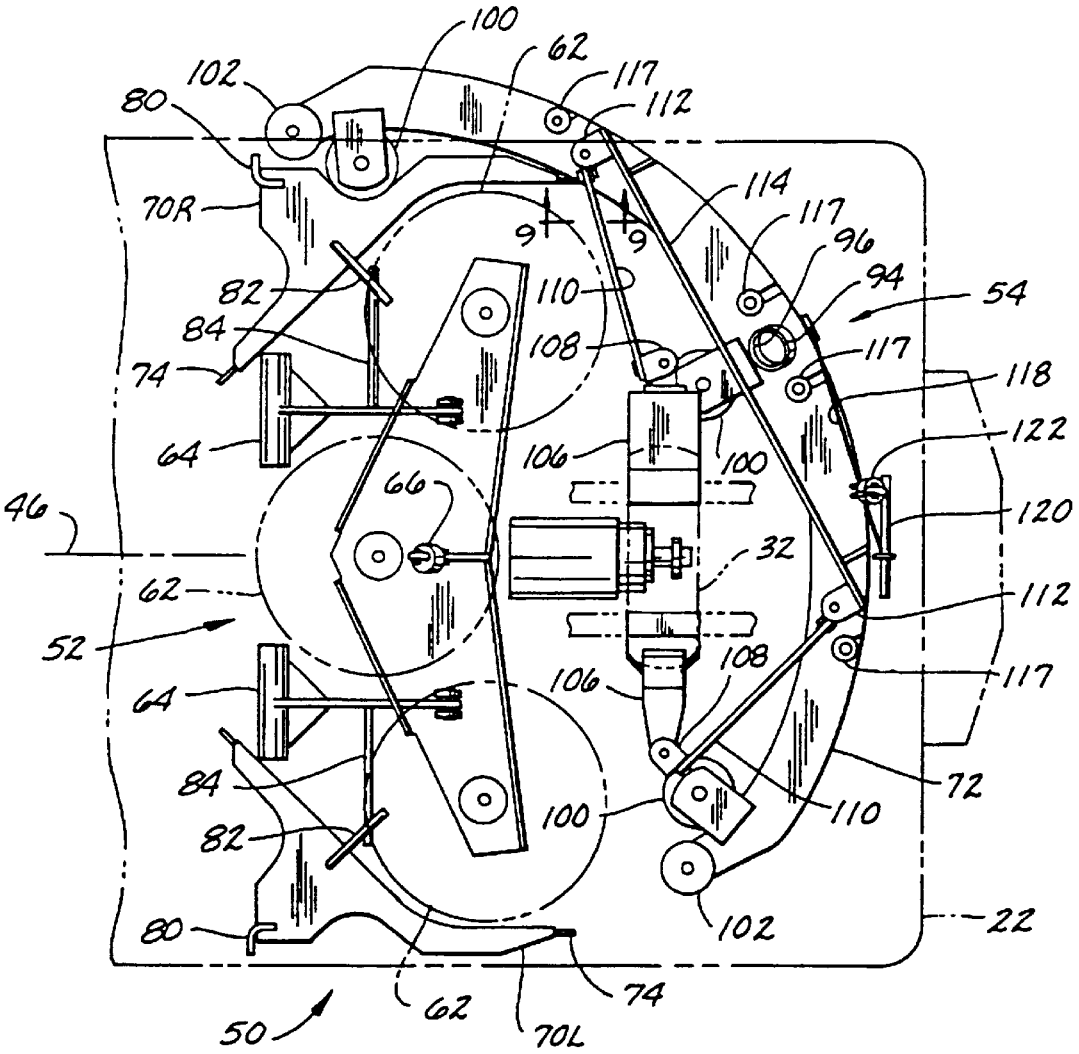
FIG. 5 is a top plan of the system shown during a 90° right-hand turn.
Figure 9:
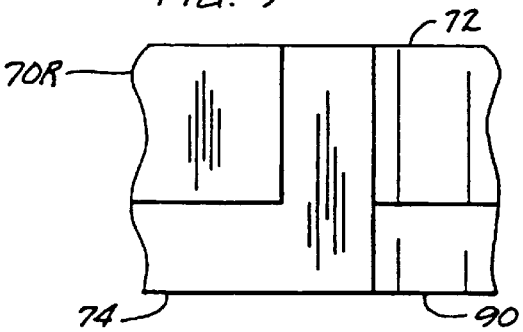
FIG. 9 is a fragmentary elevation of the rear and right side squeegees taken from line 9—9 of FIG. 5.

FIG. 5 illustrates the position of the solution recovery system 54 during a minimum radius, right-hand turn. (The position of the recovery system during left-hand turn is generally opposite the position shown in FIG. 5.) During a minimum radius, right-hand turn, the caster 100 adjacent the right end of the rear squeegee 72 contacts the right side squeegee 70R to prevent further movement. Thus, the rear squeegee 72 cannot swing beyond the position shown in FIG. 5. The flexibility of the vacuum hose 94 and cable 118 connected to the rear squeegee 72 permit the squeegee to move to the position shown. In this position, the front blade 90 of the rear squeegee 72 contacts the rearward end of the right side squeegee blade 74 so that the right side and rear squeegees form an uninterrupted continuous barrier extending from the left end of the rear squeegee to the forward end of the right side squeegee 70R as shown in FIG. 9 to retain cleaning solution beneath the machine. The left side squeegee 70L travels away from the wetted floor area so that it has no effect on the cleaning solution. Because the forward portion of the right side squeegee 70R is obliquely angled rearward and laterally outward from its forward end, solution travels rearward and laterally outward along the squeegee and no solution flows past the forward end of the right side squeegee 70R. Further, the solution travelling rearward is trapped along the rearward portion of the right side squeegee 70R. When the turn is completed and the scrubber 20 is driven forward in a straight line, the trapped solution flows to the center of the rear squeegee 72 and is sucked through the vacuum hose 94 into the recovery tank 98.

Figure 5A:
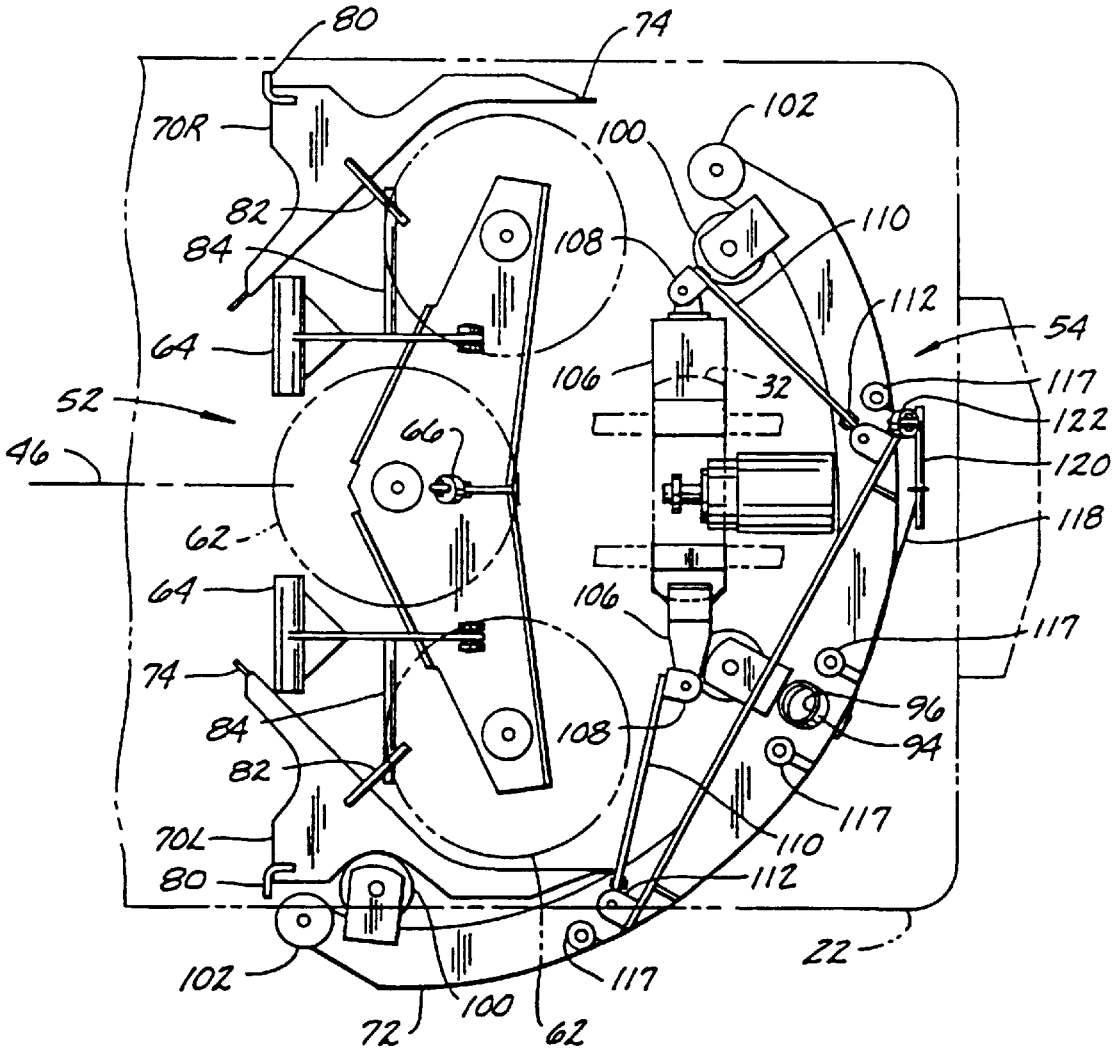
FIG. 5A is a top plan of the system shown during a 90° left-hand turn.

The solution recovery system 54 behaves similarly in a minimum radius, left-hand turn as shown in FIG. 5A. For brevity, the left-hand turn behavior will not be explained in detail. In larger radius turns, the system 54 also operates in a similar fashion. However, when the rear squeegee blade 90 does not contact one of the side squeegee blades 74, the side squeegee blades immediately direct the solution toward the rear squeegee blade, rather than trap the solution along the rearward portion of the side squeegee blade until the scrubber travels in a straight line. Therefore, the solution recovery system 54, and in particular the rear and side squeegee apparatus of the present invention assures complete cleaning solution removal during forward travel regardless of whether the travel is in a straight line or turning.

FIG. 6 illustrates the solution recovery system 54 in the raised position wherein the side squeegees 70L, 70R, the rear squeegee 72 and the scrub brush means 52 are raised substantially off the surface. The controls 28 allow the operator to raise the system to the raised position when not in use, e.g., when the scrubber 20 is only being used to sweep the surface or when the scrubber is being transported to a particular work site. Thus, the squeegee blades 74, 90 need not be abraded by the surface when they are not being used to remove cleaning solution. The controls 28 may also include a logic circuit which raises the solution recovery system 54 when the scrubber 20 travels in a rearward direction to avoid damage to the system.

Thus, the surface scrubber 20 of the preferred embodiment overcomes each of the problems associated with prior art surface scrubbers identified above. Further, because the side squeegees are unvaryingly oriented with respect to the scrubber frame, the complicated linkages connecting the side squeegees to the rear squeegee to control movement of the side squeegee during turns are eliminated. This reduces the manufacturing and maintenance costs and increases the reliability of the apparatus of the present invention as compared to the prior art devices having rotating side squeegees.

In view of the above, it will be seen that the several objects of the invention are achieved and other advantageous results attained.

The surface scrubber shown in FIG. 1 is an American-Lincoln 7700 Sweeper Scrubber manufactured by Clarke Industries. Inc. of St. Louis. Mo.; however, it should be understood that the present invention is equally applicable to other surface scrubbers including push models. As various changes could be made in the above constructions without departing from the scope of the invention, it is intended that all matter contained in the above description or shown in the accompanying drawings shall be interpreted as illustrative and not in a limiting sense.

What is claimed is:

1. A mobile surface scrubber for scrubbing a surface wetted with cleaning solution, said scrubber comprising:

a frame having a front, a back, left and right sides as viewed looking forward from the back of the frame, and a central longitudinal axis extending in a front-to-back direction relative to the frame;

a plurality of wheels rotatably mounted on the frame for transporting said scrubber over the surface in a plurality of directions including forward, left turning, and right turning directions;

scrub brush means attached to said frame and positioned to scrub the wetted surface as said scrubber is transported over the surface; and a recovery system for recovering cleaning solution from the surface, said recovery system including a return tank for retaining recovered cleaning solution, an elongate rear squeegee pivotally connected to said frame, and left and right elongate side squeegees mounted on the frame adjacent the left and right sides of the frame, respectively, said rear squeegee having opposite left and right ends, each of said side squeegees having forward and rearward ends, said rear squeegee being positionable to contact said surface behind said scrub brush means when said scrubber is transported in the forward direction, said side squeegees being unvaryingly oriented with respect to the frame and positionable to contact said surface on opposite sides of said scrub brush means when said scrubber is transported in the forward direction, said rear squeegee being so constructed and operable that when said scrubber is transported in a right turning direction the rear squeegee pivots relative to the frame to a position in which the right end of the rear squeegee overlaps the rearward end of the right side squeegee, and when said scrubber is transported in a left turning direction the rear squeegee pivots relative to the frame to a position in which the left end of the rear squeegee overlaps the rearward end of the left side squeegee.

2. A scrubber as set forth in claim 1 wherein said rear squeegee includes a central portion positioned between and behind its said opposite ends.

3. A scrubber as set forth in claim 2 wherein said rear squeegee is arcuate.

4. A scrubber as set forth in claim 1 wherein each side squeegee has a rear portion and a forward portion positioned inboard from the rear portion.

5. A scrubber as set forth in claim 4 wherein the rear portion of each side squeegee extends generally parallel to the central longitudinal axis of the frame.

6. A scrubber as set forth in claim 5 wherein the forward portion of each side squeegee extends inwardly and forwardly from said rearward portion to a position in front of said scrub brush means.

7. A scrubber as set forth in claim 6 further comprising a liquid dispensing system attached to said frame for dispensing cleaning solution onto said surface, each side squeegee extending to a position in front of said liquid dispensing system.

8. A scrubber as set forth in claim 6 wherein said scrub brush means comprises a left rotary scrub brush adjacent the left side of the frame, a right rotary scrub brush adjacent the right side of the frame, and a central rotary scrub brush between the left and right scrub brushes, the forward portion of the left side squeegee angling inwardly and forwardly to a position in front of the left rotary scrub brush, and the right side squeegee angling inwardly and forwardly to a position in front of the right rotary scrub brush, the forward ends of the left and right side squeegees being laterally spaced from one another on opposite sides of said central longitudinal axis of the frame.

9. A scrubber as set forth in claim 8 wherein the forward ends of the left and right side squeegees are spaced apart a distance greater than the diameter of the central rotary scrub brush.

10. A scrubber as set forth in claim 9 wherein the rearward ends of the left and right side squeegees are positioned rearward of a line extending in a side-to-side direction with respect to the frame through the rotational axes of the left and right rotary scrub brushes.

11. A scrubber as set forth in claim 1 wherein a respective end of the rear squeegee overlaps a respective side squeegee outboard of the side squeegee when said scrubber is transported in either of the turning directions.

12. A scrubber as set forth in claim 1 wherein said rear squeegee is selectively moveable between a raised position in which the rear squeegee is spaced above said surface and a lowered position in which the rear squeegee contacts said surface.

13. A scrubber as set forth in claim 12 further comprising a linkage connecting said rear squeegee to said frame, the linkage maintaining the rear squeegee in a constant attitude relative to the scrubber as the scrubber is transported over the surface and permitting the rear squeegee to move up and down relative to the scrubber to accommodate surface discontinuities.

14. A scrubber as set forth in claim 1 wherein said side squeegees are selectively moveable between a raised position in which the side squeegees are spaced above said surface and a lowered position in which the side squeegees contact said surface.

15. A mobile surface scrubber for scrubbing a surface wetted with cleaning solution, said scrubber comprising:

a frame having a front, a back, left and right sides as viewed looking forward from the back of the frame, and a central longitudinal axis extending in a front-to-back direction relative to the frame;

a plurality of wheels rotatably mounted on said frame for transporting said scrubber over the surface in a plurality of directions including forward, left turning, and right turning directions;

scrub brush means attached to said frame and positioned to scrub the wetted surface as said scrubber is transported over the surface; and left and right side squeegees mounted on said frame adjacent the left and right sides of the frame, respectively, said squeegees being unvaryingly oriented with respect to said frame and having rearward portions outboard of said scrub brush means and forward portions extending laterally inwardly and forwardly to positions in front of said scrub brush means.

16. A scrubber as set forth in claim 15 further comprising a liquid dispensing system attached to said frame for dispensing cleaning solution onto said surface, the forward portions of said side squeegees extending to positions in front of said liquid dispensing system.

17. A scrubber as set forth in claim 15 wherein the rearward portion of each side squeegee extends generally parallel to the central longitudinal axis of the frame.

18. A scrubber as set forth in claim 17 further comprising a cylindric brush mounted for rotation on the frame about a generally horizontal axis extending side-to-side with respect to the frame forward of said scrub brush means and the side squeegees, and a recovery system for recovering cleaning solution from the surface, said recovery system including a return tank for retaining recovered cleaning solution, and an elongate rear squeegee mounted on the frame behind said scrub brush means and said side squeegees for directing cleaning solution from the surface for delivery to said return tank.

19. A mobile surface scrubber for scrubbing a surface wetted with cleaning solution, said scrubber comprising:

a frame having a front, a back, left and right sides as viewed looking forward from the back of the frame, and a central longitudinal axis extending in a front-to-back direction relative to the frame;

a plurality of wheels rotatably mounted on the frame for transporting said scrubber over the surface in a plurality of directions including forward, left turning, and right turning directions;

scrub brush means attached to said frame and positioned to scrub the wetted surface as said scrubber is transported over the surface; and a recovery system for recovering cleaning solution from the surface, said recovery system including a return tank for retaining recovered cleaning solution, an elongate rear squeegee pivotally connected to said frame, and left and right elongate side squeegees mounted on said frame adjacent the left and right sides of the frame, respectively, said rear squeegee having opposite left and right ends, each of said side squeegees having forward and rearward ends, said rear squeegee being positionable to contact said surface behind said scrub brush means when said scrubber is transported in the forward direction, said side squeegees being unvaryingly oriented with respect to the frame and positionable to contact said surface on opposite sides of said scrub brush means when said scrubber is transported in the forward direction, said rear squeegee being so constructed and operable that when said scrubber is transported in a right turning direction the rear squeegee pivots relative to the frame to a position in which the rear and right side squeegees form an uninterrupted continuous barrier extending from the left end of the rear squeegee to the forward end of the right side squeegee for collecting cleaning solution, and when said scrubber is transported in a left turning direction the rear squeegee pivots relative to the frame to a position in which the rear and left side squeegees form an uninterrupted continuous barrier extending from the right end of the rear squeegee to the forward end of the left side squeegee for collecting cleaning solution.

20. A scrubber as set forth in claim 19 wherein each of said left and right side squeegees has a rearward portion positioned outboard of said scrub brush means and a forward portions extending laterally inwardly and forwardly to positions in front of said scrub brush means.

*21. A mobile surface scrubber for scrubbing a surface wetted with cleaning solution, said scrubber comprising:*

*a frame having a front, a back, left and right sides as viewed looking forward from the back of the frame, and a central longitudinal axis extending in a front-to-back direction relative to the frame;*

*a plurality of wheels rotatably mounted on the frame for transporting said scrubber over the surface in a plurality of directions including forward, left turning, and right turning directions;*

*scrub brush means attached to said frame and positioned to scrub the wetted surface as said scrubber is transported over the surface; and*

*a recovery system for recovering cleaning solution from the surface, said recovery system including a return tank for retaining recovered cleaning solution, an elongate rear squeegee pivotally connected to said frame, and left and right elongate side squeegees mounted adjacent to the left and right sides of the frame, respectively, said rear squeegee having opposite left and right ends, each of said side squeegees having forward and rearward ends, said rear squeegee being positionable to contact said surface behind said scrub brush means when said scrubber is transported in the forward direction, said side squeegees being unvaryingly oriented with respect to the frame and positionable to contact said surface on opposite sides of said scrub brush means when said scrubber is transported in the forward direction, said rear squeegee being so*

*constructed and operable that when said scrubber is transported in a right turning direction the rear squeegee pivots relative to the frame to a position in which the right end of the rear squeegee overlaps the rearward end of the right side squeegee, and when said scrubber is transported in a left turning direction the rear squeegee pivots relative to the frame to a position in which the left end of the rear squeegee overlaps the rearward end of the left side squeegee.*

*22. A mobile surface scrubber for scrubbing a surface wetted with cleaning solution, said scrubber comprising:*

*a frame having a front, a back, left and right sides as viewed looking forward from the back of the frame, and a central longitudinal axis extending in a front-to-back direction relative to the frame;*

*a plurality of wheels rotatably mounted on the frame for transporting said scrubber over the surface in a plurality of directions including forward, left turning, and right turning directions;*

*scrub brush means attached to said frame and positioned to scrub the wetted surface as said scrubber is transported over the surface; and*

*a recovery system for recovering cleaning solution from the surface, said recovery system including a return tank for retaining recovered cleaning solution, an elongate rear squeegee pivotally connected to said frame, and left and right elongate side squeegees mounted adjacent to the left and right sides of the frame, respectively, said rear squeegee having opposite left and right ends, each of said side squeegees having forward and rearward ends, said rear squeegee being positionable to contact said surface behind said scrub brush means when said scrubber is transported in the forward direction, said side squeegees being unvaryingly oriented with respect to at least a portion of said scrub brush means and positionable to contact said surface on opposite sides of said scrub brush means when said scrubber is transported in the forward direction, said rear squeegee being so constructed and operable that when said scrubber is transported in a right turning direction the rear squeegee pivots relative to the frame to a position in which the right end of the rear squeegee overlaps the rearward end of the right side squeegee, and when said scrubber is transported in a left turning direction the rear squeegee pivots relative to the frame to a position in which the left end of the rear squeegee overlaps the rearward end of the left side squeegee.*

* * * * *